(12) United States Patent
Kadotani et al.

(10) Patent No.: US 9,667,926 B2
(45) Date of Patent: May 30, 2017

(54) PROJECTOR

(71) Applicant: Seiko Epson Corporation, Tokyo (JP)

(72) Inventors: Norikazu Kadotani, Matsumoto (JP); Fumihide Sasaki, Azumino (JP); Hideki Takasuka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/162,682

(22) Filed: May 24, 2016

(65) Prior Publication Data
US 2016/0353067 A1 Dec. 1, 2016

(30) Foreign Application Priority Data

May 26, 2015 (JP) ................................. 2015-106179
Jan. 18, 2016 (JP) ................................. 2016-006849

(51) Int. Cl.
*G03B 21/16* (2006.01)
*H04N 9/31* (2006.01)

(52) U.S. Cl.
CPC ........... *H04N 9/3144* (2013.01); *G03B 21/16* (2013.01); *H04N 9/3197* (2013.01)

(58) Field of Classification Search
CPC .............................. H04N 9/3144; G03B 21/16
See application file for complete search history.

(56) References Cited

U.S. PATENT DOCUMENTS

| 8,678,597 | B2 * | 3/2014 | Nishimura | ............. | G03B 21/16 353/119 |
| 2009/0141249 | A1 * | 6/2009 | Yanagisawa | ........... | G03B 21/16 353/61 |
| 2011/0019160 | A1 * | 1/2011 | Kitano | ................... | G03B 21/16 353/57 |
| 2011/0032489 | A1 * | 2/2011 | Kimoto | .................. | G03B 21/16 353/56 |
| 2012/0013854 | A1 * | 1/2012 | Nishimura | ............. | G03B 21/16 353/57 |
| 2016/0147034 | A1 * | 5/2016 | Shoujiguchi | ............ | F28D 15/02 359/512 |
| 2016/0291449 | A1 * | 10/2016 | Masuda | ................. | G03B 21/16 |
| 2017/0052434 | A1 * | 2/2017 | Masuda | ................. | G03B 21/16 |

FOREIGN PATENT DOCUMENTS

JP        2009-133988 A       6/2009

* cited by examiner

*Primary Examiner* — Bao-Luan Le
(74) *Attorney, Agent, or Firm* — ALG Intellectual Property, LLC

(57) ABSTRACT

A projector includes a circulation cooling device, a controller that controls the projector, and an exterior housing that accommodates the circulation cooling device and the controller and forms the exterior of the projector. The circulation cooling device includes a cooling fan that blows a cooling gas to an object to be cooled, a heat absorber that absorbs heat of the gas having cooled the object to be cooled, and a relay section that forms, along with the closed housing, a closed space and relays electrical connection between the cooling fan and the controller, and the relay section includes a double-sided substrate having an inner surface which faces the closed space and on which a connection member electrically connected to the cooling fan is arranged and an outer surface which faces away from the closed space and on which a connection member electrically connected to the controller is arranged.

9 Claims, 13 Drawing Sheets

PROJECTOR

BACKGROUND

1. Technical Field

The present invention relates to a projector.

2. Related Art

There is a known projector of related art including a light source, a light modulator that modulates light emitted from the light source in accordance with image information, and a projection optical apparatus that projects the modulated light from the light modulator and projecting an image on a projection surface, such as a screen. In recent years, as the intensity of light emitted from a light source increases, there is a demand for a projector capable of suppressing degradation in image quality due, for example, to dust even when the projector having such a high-intensity light source is used in a large hall where a music concert and other events take place. Under these circumstances, there is a proposed projector using a dust-proof light modulator and other optical elements for efficient cooling (see JP-A-2009-133988, for example).

The projector described in JP-A-2009-133988 includes a cooling unit that forms a closed structure and a control substrate, and the cooling unit has a plurality of duct members, a circulation fan arranged in the closed structure, and a heat exchanger. Light modulators as an object to be cooled are arranged in the closed structure and cooled with air circulated in the closed structure by the circulation fan.

Although not disclosed in JP-A-2009-133988, the circulation fan is considered to be controlled by the control substrate. Therefore, to electrically connect the circulation fan to the control substrate, it is considered that the closed structure is provided with an insertion hole through which the cable of the circulation fan is inserted, and that a member that fills the gap between the insertion hole and the cable, such as a cushioning material, is further provided. It is, however, conceivable that the technology described above complicates the process of routing the cable and placing the filling member, such as a cushioning material. Further, to repair or exchange the circulation fan, it is necessary to disassemble the projector to a point where the control substrate is exposed and remove the cable of the circulation fan from the control substrate. That is, the projector described in JP-A-2009-133988 is problematic in that not only is the cooling unit manufactured in a complicated manner but also repair and exchange of the circulation fan and other electronic parts arranged in the closed structure is complicated.

SUMMARY

An advantage of some aspects of the invention is to solve at least a part of the problems described above, and the invention can be implemented as the following aspects or application examples.

Application Example 1

A projector according to this application example is a projector including a light source and a light modulator and projects an image, the projector including a circulation cooling device that has a closed housing accommodating an object to be cooled and cools the object to be cooled by circulating a cooling gas in the closed housing, a controller that is arranged outside the circulation cooling device and controls the projector, and an exterior housing that accommodates the circulation cooling device and the controller and forms an exterior of the projector. The circulation cooling device includes a cooling fan that is arranged in the closed housing and blows the cooling gas to the object to be cooled, a heat absorber that absorbs heat of the gas having cooled the object to be cooled, and a relay section that forms, along with the closed housing, a closed space and relays electrical connection between the cooling fan and the controller, and the relay section includes a double-sided substrate having an inner surface which faces the closed space and on which a connection member electrically connected to the cooling fan is arranged and an outer surface which faces away from the closed space and on which a connection member electrically connected to the controller is arranged.

According to the configuration described above, the circulation cooling device includes the relay section that electrically relays the cooling fan arranged in the closed space to the controller arranged outside the closed space, and the relay section forms, along with the closed housing, to form the closed space. The object to be cooled is arranged in the closed housing together with the cooling fan and cooled. That is, since the circulation cooling device has the configuration in which the relay section is used to form the closed space, as compared with a configuration in which cables are wired from the interior to the exterior of the closed space, no member that fills the gap between the cables and an insertion hole through which the cables are inserted is required, and the process of wiring the cables and other processes can be simplified. The projector, which includes the circulation cooling device that can be readily manufactured, can therefore prevent external dust from adhering to the object to be cooled (optical element, for example) in the closed space but cool the object to be cooled.

Further, the relay section is provided with the connection members described above on the inner and outer surfaces of the double-sided substrate, and the connection members are connected to the controller. As a result, the cooling fan arranged in the closed space can be readily removed by disassembling the projector to a point where the connection members on the inner surface are exposed without need to disassemble the projector to a point where the controller is exposed. Repair and exchange of the cooling fan can therefore be simplified.

Application Example 2

In the projector according to the application example described above, it is preferable that the relay section includes an elastic member that covers an end surface of the double-sided substrate and that is so arranged as to be in intimate contact with the closed housing.

According to the configuration described above, even in a case where the double-sided substrate has been so cut or otherwise processed in the manufacturing process thereof that the end surface thereof tends to produce dust, a situation in which the relay section produces dust can be avoided because the elastic member covers the end surface. Further, since the elastic member is in intimate contact with the closed housing, the closed space can be reliably formed.

Application Example 3

In the projector according to the application example described above, it is preferable that the closed housing includes a first accommodation section and a second accommodation section, the circulation cooling device further includes a circulation fan arranged in the closed space and circulating, in the second accommodation section, the cooling gas the heat of which has been absorbed heat by the heat absorber, and that the double-sided substrate has a connection member arranged on the inner surface and electrically connected to the circulation fan and relays electrical connection between the circulation fan and the controller.

According to the configuration described above, since the circulation cooling device further includes the circulation fan described above, the cooling gas is actively supplied into the closed space, whereby the object to be cooled can be cooled in a more efficient manner. The circulation fan is also connected to the controller via the relay section. Therefore, even when the cooling fan and the circulation fan are arranged in the closed space, the circulation cooling device, while maintaining the closed space, allows the controller to control the cooling fan and the circulation fan. Further, the circulation fan can be readily repaired and exchanged, as in the case of the cooling fan.

Application Example 4

It is preferable that the projector according to the application example described above further includes an electronic part arranged outside the closed space, and the double-sided substrate has a connection member arranged on the outer surface and electrically connected to the electronic part and electrically relays the electronic part to the controller.

According to the configuration described above, the double-sided substrate can be used to electrically connect the electronic part arranged outside the closed space to the controller. The electronic part arranged outside the closed space can also therefore be readily repaired and exchanged.

Application Example 5

In the projector according to the application example described above, it is preferable that the closed housing is formed of a first accommodation section that accommodates the object to be cooled and a second accommodation section that accommodates the cooling fan and has an opening closed by the relay section.

According to the configuration described above, even when the object to be cooled and the cooling fan are so configured as to separate from each other, the closing housing can be readily formed with an increase in size of the closed housing suppressed. Therefore, the flexibility in the position where the cooling fan is arranged can be increased, and the circulation cooling device can be configured with an increase in size thereof suppressed.

Application Example 6

In the projector according to the application example described above, it is preferable that the second accommodation section includes an attachment-side housing to which the cooling fan is attached and a cover-side housing that accommodates, along with the attachment-side housing, the cooling fan and is detachably attached to the attachment-side housing, and that the relay section is arranged in the second accommodation section with the relay section sandwiched between the attachment-side housing and the cover-side housing.

According to the configuration described above, the relay section can be arranged in a predetermined position with no use of screws or other fixing members. Therefore, an increase in the number of parts can be suppressed, and the relay section and the second accommodation section can be reduced in size.

Application Example 7

In the projector according to the application example described above, it is preferable that the exterior housing has an exposing opening through which part of interior of the exterior housing is exposed and a lid member that closes the exposing opening, and that the second accommodation section is so arranged that the cover-side housing is exposed through the exposing opening when the lid member is removed.

According to the configuration described above, since the cover-side housing is exposed when the lid member is removed, a user can expose the cooling fan and the connection member arranged on the inner surface of the double-sided substrate by removing the cover-side housing. Repair and exchange of the cooling fan can be further simplified.

Application Example 8

In the projector according to the application example described above, it is preferable that the exterior housing has an exposing opening through which part of interior of the exterior housing is exposed and a lid that is integrated with the cover-side housing and closes the exposing opening, and that the second accommodation section is so arranged that interior of the attachment-side housing is exposed through the exposing opening.

The configuration described above allows the formation of the second accommodation section and the fixation of the relay section with the number of parts reduced. Further, since the user can expose the cooling fan arranged in the attachment-side housing and connection member arranged on the inner surface of the double-sided substrate by removing the lid, whereby repair and exchange of the cooling fan and other components can be further simplified.

Application Example 9

In the projector according to the application example described above, it is preferable that the exterior housing has a bottom surface facing an installation surface on which the projector is installed, and that the relay section is so arranged that the double-sided substrate stands with respect to the bottom surface.

According to the configuration described above, in which the double-sided substrate is so arranged as to stand with respect to the bottom surface of the exterior housing, an increase in size of the second accommodation section in the direction along the bottom surface can be suppressed, and the flexibility in the position where the relay section is arranged is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a projection surface, such as a screen. The projector according to the present embodiment is configured to be capable of taking a horizontally oriented posture in which the projector is installed on a desktop or any other surface and projects a horizontally elongated image on the projection surface and a vertically oriented posture in which the projector is rotated by 90° from the horizontally oriented posture when viewed from the side facing the projection surface and projects a vertically elongated image on the projection surface.

Primary Configuration of Projector

Figure 1:
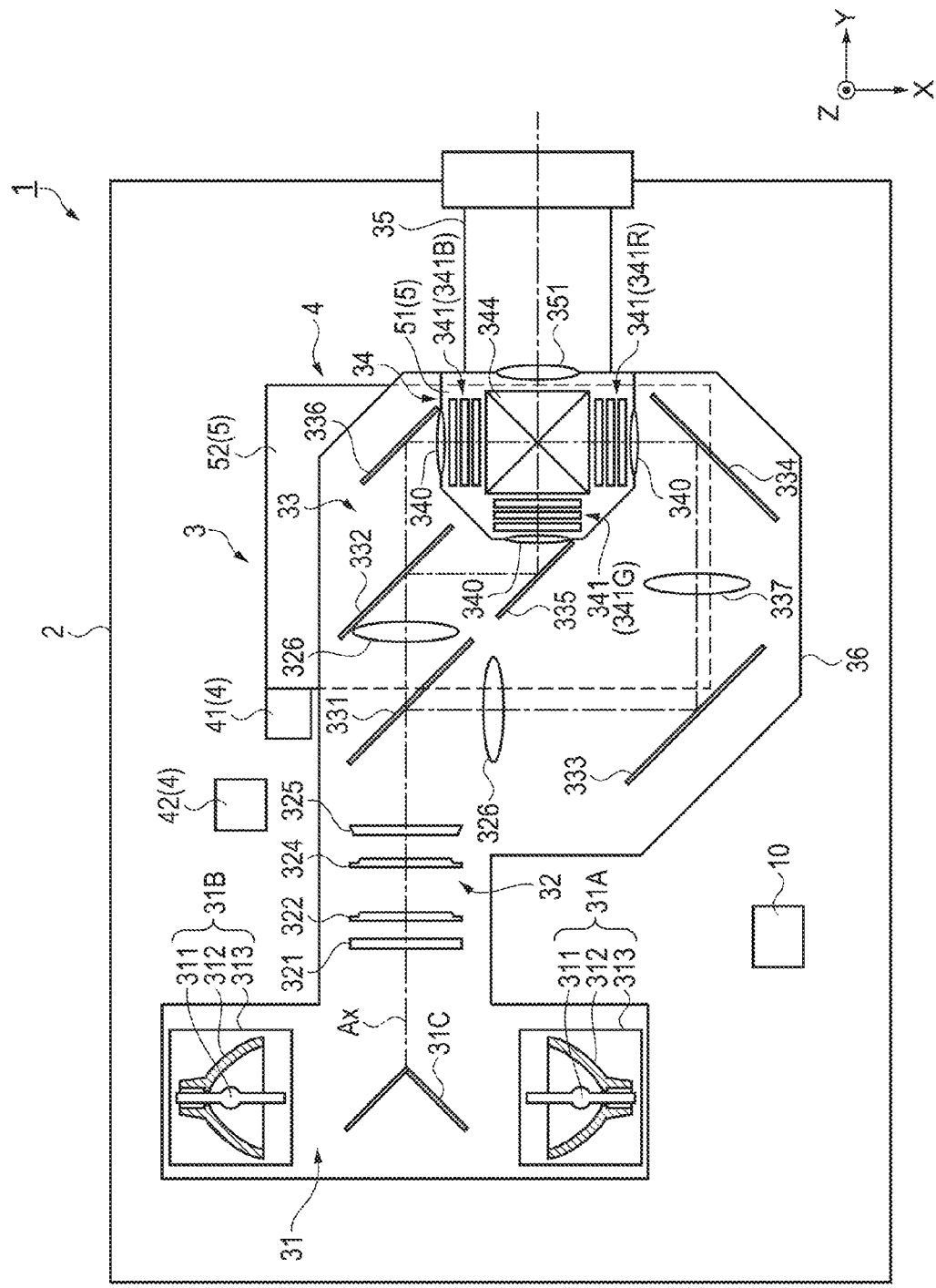
FIG. 1 is a diagrammatic view showing a primary configuration of a projector according to an embodiment of the invention.
Figure 2:
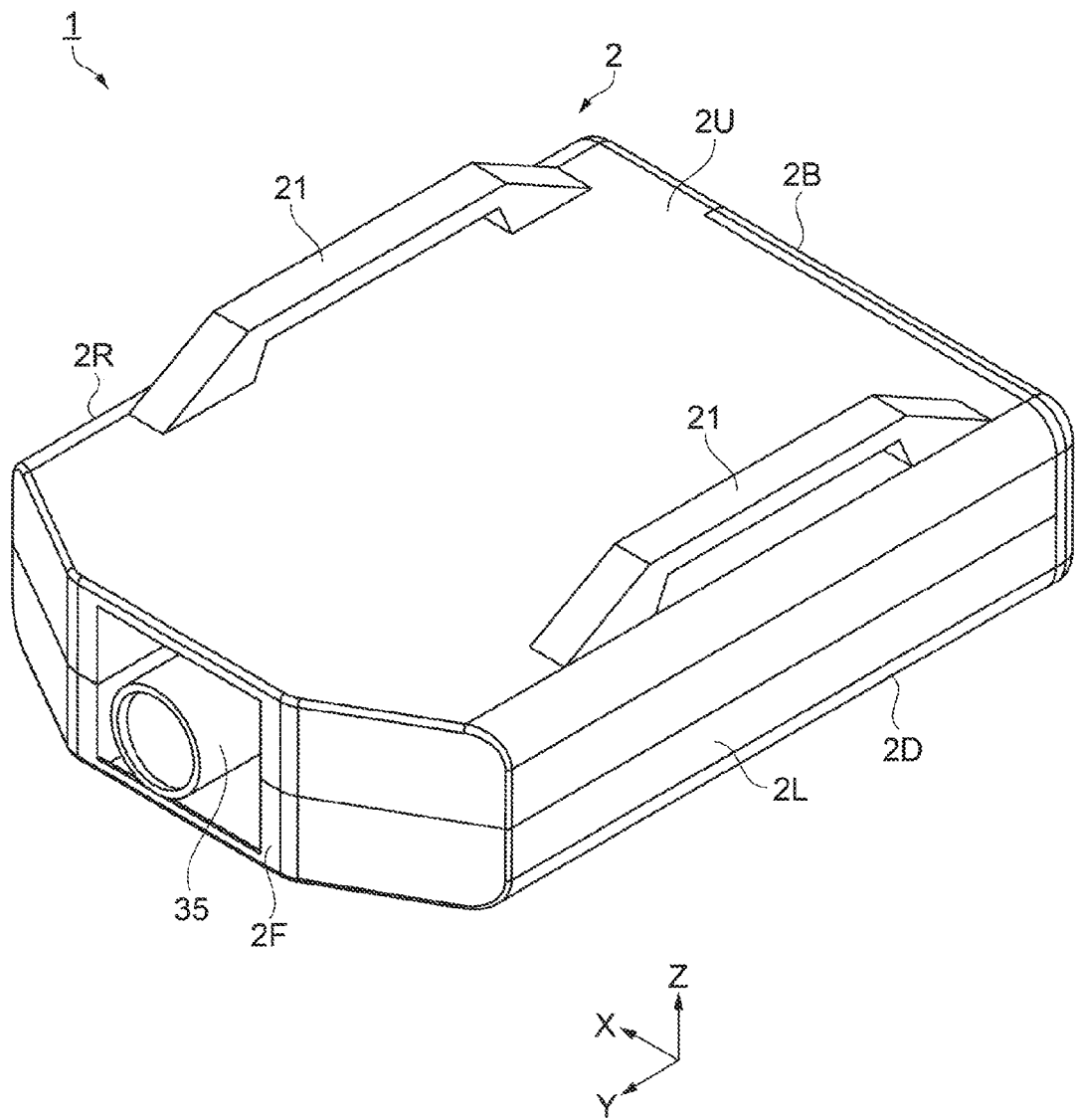
FIG. 2 is a perspective view diagrammatically showing the exterior appearance of the projector according to the present embodiment.

FIG. 1 is a diagrammatic view showing a primary configuration of a projector 1 according to the present embodiment. FIG. 2 is a perspective view diagrammatically showing the exterior appearance of the projector 1.

The projector 1 includes an exterior housing 2, which forms the exterior of the projector 1, a controller 10, an optical unit 3, which has an illumination apparatus 31, and a cooling apparatus 4, as shown in FIGS. 1 and 2. Although not shown, a power supply apparatus that supplies the illumination apparatus 31 and the controller 10 with electric power and other apparatus are arranged in the exterior housing 2. In the following description, the following definition is made for ease of description: In the projector 1 in the horizontally oriented posture, the side where the projection surface is present is called a +Y side (front side); the right side viewed from the side facing the projection surface is called a +X side; and the upper side in the vertical direction is called a +Z side.

The exterior housing 2, although not described in detail, is configured in the form of a combination of a plurality of members and accommodates the controller 10, the optical unit 3, the cooling apparatus 4, and other components. The exterior housing 2 has the following surfaces in the horizontally oriented posture as shown in FIG. 2: an upper surface 2U, which forms the upper side; a bottom surface 2D, which faces an installation surface on which the projector 1 is installed; a front surface 2F, which forms the front side; a rear surface 2B, which forms the rear side; and right and left side surfaces 2R, 2L. The upper surface 2U is provided with a pair of handles 21, which are gripped by a user when the user carries or otherwise handles the projector 1, and the bottom surface 2D is provided with legs 22 (see FIG. 10A) for supporting the projector 1 and a lid member 23 (see FIG. 10A). The exterior housing 2 is further provided with, although not shown, an intake port through which outside air is taken in, a discharge port through which heated air inside the exterior housing 2 is discharged, and other ports.

The controller 10 has a circuit substrate on which a CPU (central processing unit), a ROM (read only memory), a RAM (random access memory), and other circuit devices are implemented and is arranged outside the optical unit 3 and the cooling apparatus 4. The controller 10 functions as a computer and controls the action of the projector 1, for example, performs control relating to image projection, control relating to the action of the cooling apparatus 4, and other types of control.

The optical unit 3 modulates light outputted from the illumination apparatus 31 according to the image information and projects the modulated light on the projection surface under the control of the controller 10.

The optical unit 3, which includes the illumination apparatus 31, further includes an optical integration illumination system 32, a color separation system 33, an optical apparatus 35 having light modulators 341, a projection lens 36 as a projection optical apparatus, and an optical part housing 36, which accommodates the members described above, as shown in FIG. 1.

The illumination apparatus 31 includes a pair of light source apparatus 31A and 31B, which are so arranged as to face each other, and a reflection mirror 31C, which is arranged between the pair of light source apparatus 31A and 31B.

The pair of light source apparatus 31A and 31B have the same configuration and each include a discharge-type light source 311, a reflector 312, and a light source housing 313, which accommodates the light source 311 and the reflector 312. The pair of light source apparatus 31A and 31B output light toward the reflection mirror 31C.

The reflection mirror 31C reflects the light outputted from the light source apparatus 31A and 31B in the same direction (+Y direction) and causes the reflected light to be incident on the optical integration illumination system 32.

The optical integration illumination system 32 includes a UV filter 321, a first lens array 322, a second lens array 324, a polarization conversion element 325, and a superimposing lens 326. The first lens array 322, the second lens array 324, and the superimposing lens 326 roughly homogenize the light outputted from the light source apparatus 31A and 31B on the surfaces of the light modulators 341. The polarization conversion element 325 randomly polarized light having exited out of the second lens array 324 into first linearly polarized light that can be used by the light modulators 341.

The color separation system 33 includes dichroic mirrors 331 and 332, reflection mirrors 333 to 336, and a relay lens 337, separates the light having exited out of the optical integration illumination system 32 into red light (R light), green light (G light), and blue light (B light), and guides them to the optical apparatus 34.

The optical apparatus 34 includes field lenses 340 and the light modulators 341 provided on a color basis and a cross dichroic prism 344 as a light combining optical apparatus. The light modulators for the R light, the G light, and the B light are called light modulators 341R, 341G, and 341B, respectively.

Each of the light modulators 341 has a transmissive liquid crystal panel, a light-incident-side polarizer arranged on the light incident side of the liquid crystal panel, and a light-exiting-side polarizer arranged on the light exiting side of the liquid crystal panel and modulates the corresponding color in accordance with image information. The cross dichroic prims 344 reflects the R light and the B light modulated by the light modulators 341R and 341B and transmits the G light modulated by the light modulator 341G to combine the three color modulated light fluxes with one another.

The projection lens 35 is formed of a plurality of lenses including a lens 351, which is arranged on the side facing the cross dichroic prism. 344, and enlarges and projects the combined light from the cross dichroic prism 344 on a projection surface.

The cooling apparatus 4 includes a circulation cooling device 5, a heat dissipater 6 (see FIG. 3), blower fans 41 and 42, a duct member 411 (see FIG. 5), and other components.

The circulation cooling device 5 has a closed space 100 (see FIG. 3) and circulates a cooling gas (cooling air in present embodiment) in the closed space 100 to cool the light modulators 341 as the object to be cooled, which are arranged in the closed space 100. The gas used as the cooling gas is not limited to air and may instead be helium or any other gas.

The heat dissipater 6 is configured to dissipate heat generated by the circulation cooling device 5. The circulation cooling device 5 and the heat dissipater 6 will be described later in detail.

The blower fan 41 blows the cooling air, and the duct member 411 guides the cooling air blown by the blower fan 41 to the polarization conversion element 325. The blower fan 42 blows the cooling air to the reflection mirror 31C and other components via a duct member and other components that are not shown. Although not described in detail, fans for cooling the illumination apparatus 31, the power supply apparatus, and other components and duct members and other components that guide the cooling air blown by the fans are arranged in the projector 1.

Configurations of Circulation Cooling Device and Heat Dissipater

The circulation cooling device 5 and the heat dissipater 6 will be described in detail.

Figure 3:
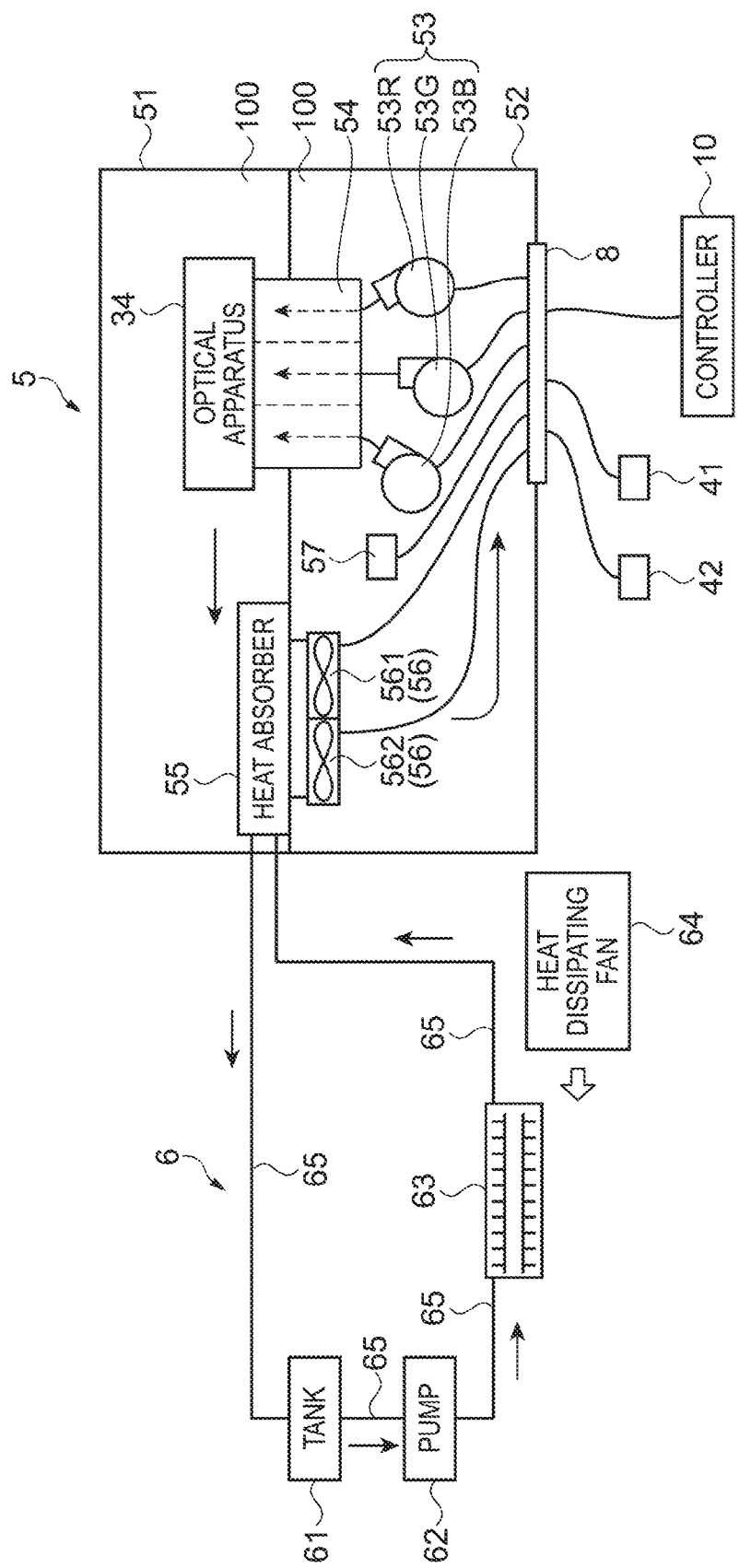
FIG. 3 is a block diagram showing primary configurations of a circulation cooling device and a heat dissipater of the present embodiment.

FIG. 3 is a block diagram showing primary configurations of the circulation cooling device 5 and the heat dissipater 6. The circulation cooling device 5 includes a first accommodation section 51, a second accommodation section 52, cooling fans 53, a duct member 54, a heat absorber 55, circulation fans 56, a temperature detector 57, and a relay section 8, as shown in FIG. 3. The first accommodation section 51 and the second accommodation section 52 forma closed housing, and the closed housing forms, along with the relay section 8, the closed space 100. The closed space 100 is configured as a closed structure that hardly allows air outside the closed housing to flow therein.

The first accommodation section 51, although not shown in detail, is formed of the optical part housing 36, the field lenses 340, the lens 351 of the projection lens 35, and other components, as shown in FIG. 1, and accommodates the optical apparatus 34 and the heat absorber 55, as shown in FIG. 3. Although not described in detail, the light modulators 341 are connected to the controller 10 via a flexible circuit substrate and other components, and the optical part housing 36 is provided with an insertion hole through which the flexible circuit substrate is inserted. An elastic member or any other component is arranged around the flexible circuit substrate and eliminates any gap between the flexible circuit substrate and the insertion hole. That is, the elastic member also forms the first accommodation section 51.

The second accommodation section 52, although will be described later in detail, is arranged below the optical part housing 36 (see FIG. 1) and accommodates the cooling fans 53, the duct member 54, the circulation fans 56, and the temperature detector 57, as shown in FIG. 3. The interior of the second accommodation section 52 communicates with the interior of the first accommodation section 51 via the circulation fans 56 and the duct member 54.

The cooling fans 53 are formed of three cooling fans (cooling fans 53R, 53G, and 53B) and arranged in the second accommodation section 52.

The cooling fans 53R, 53G, and 53B are each a sirocco fan, which takes in the cooling air in the direction along the central axis of rotation of blades and discharges the taken-in cooling air in the direction tangential to the rotation, and blow the cooling air in the second accommodation section 52 to the three light modulators 341 in the first accommodation section 51, respectively, via the duct member 54. Specifically, the cooling fan 53R blows the cooling air to the light modulator 341R, and the cooling fan 53G blows the cooling air to the light modulator 341G. The cooling fan 53B blows the cooling air to the light modulator 341B.

The duct member 54 has three inner channels so formed as to guide the cooling air discharged from the cooling fans 53R, 53G, and 53B to the light modulators 341R, 341G, and 341B, respectively.

The heat absorber 55 is connected to a flow passage tube 65 of the heat dissipater 6, absorbs heat of the air having cooled the light modulators 341, and transmits the absorbed heat to liquid in the flow passage tube 65. The liquid can, for example, be water or propylene glycol.

The circulation fans 56 are each an axial fan, formed of two circulation fans 56, and arranged in in the second accommodation section 52 and in the vicinity of the heat absorber 55. The circulation fans 56 receive the cooling air the heat of which has been absorbed by the heat absorber 55 and circulate the cooling air in the second accommodation section 52.

The temperature detector 57 detects the temperature in the second accommodation section 52 and outputs a result of the detection to the controller 10. The controller 10 controls the speed of rotation of the blades of the cooling fans 53 and the circulation fans 56 on the basis of the result of the detection performed by the temperature detector 57.

The relay section 8, which will be described later in detail, has a double-sided substrate 81 and has a function of relaying electrical connection between a plurality of electronic parts arranged in the closed space 100 in the second accommodation section 52 (cooling fans 53R, 53G, and 53B, circulation fans 561 and 562, and temperature detector 57) and the controller 10 and a function of forming, along with the first accommodation section 51 and the second accommodation section 52, the closed space 100, as shown in FIG. 3.

The heat dissipater 6 includes a tank 61, a pump 62, a heat exchanger 63, a heat dissipating fan 64, and a plurality of flow passage tubes 65.

The tank 61 is connected to the heat absorber 55 and the pump 62 via the flow passage tubes 65, stores the liquid, and supplies the liquid to an annular channel formed of the flow passage tubes 65 connected to each other.

The pump 62 is connected to the tank 61 and the heat exchanger 63 via the flow passage tubes 65 and circulates the liquid along the annular channel.

The heat exchanger 63, although not described in detail, includes a heat receiver, a Peltier element as a thermoelectric device, a heat sink, and other components and is connected to the pump 62 and the heat absorber 55 via the flow passage tubes 65. In the heat exchanger 63, the heat absorbed by the heat absorber 55 and transmitted to the liquid in the flow passage tubes 65 is received by the heat receiver and transmitted via the Peltier element or another component to the heat sink.

The heat dissipating fan 64 blows the cooling air to the heat sink in the heat exchanger 63 to dissipate the heat of the heated heat sink.

Second Accommodation Section and Configuration in Second Accommodation Section

The second accommodation section 52 and the configuration in the second accommodation section 52 will be described in detail.

Figure 4:
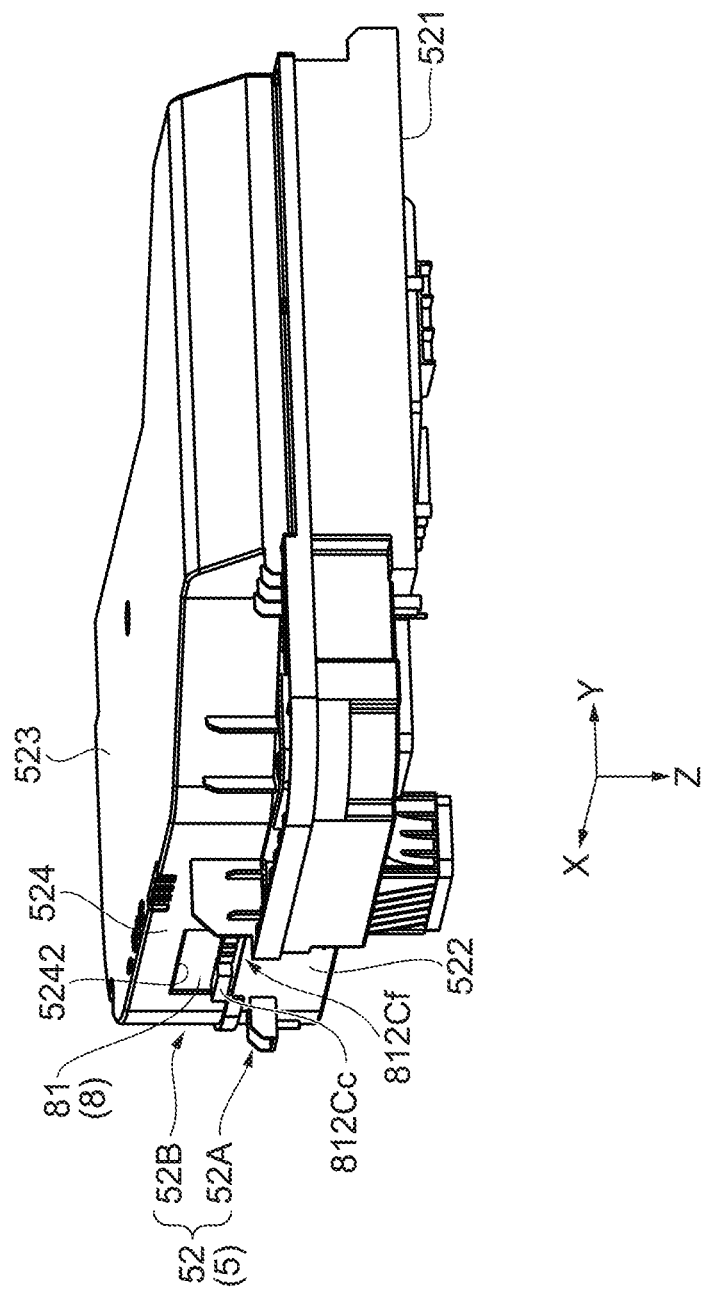
FIG. 4 is a perspective view of a second accommodation section of the present embodiment viewed from obliquely below.
Figure 5:
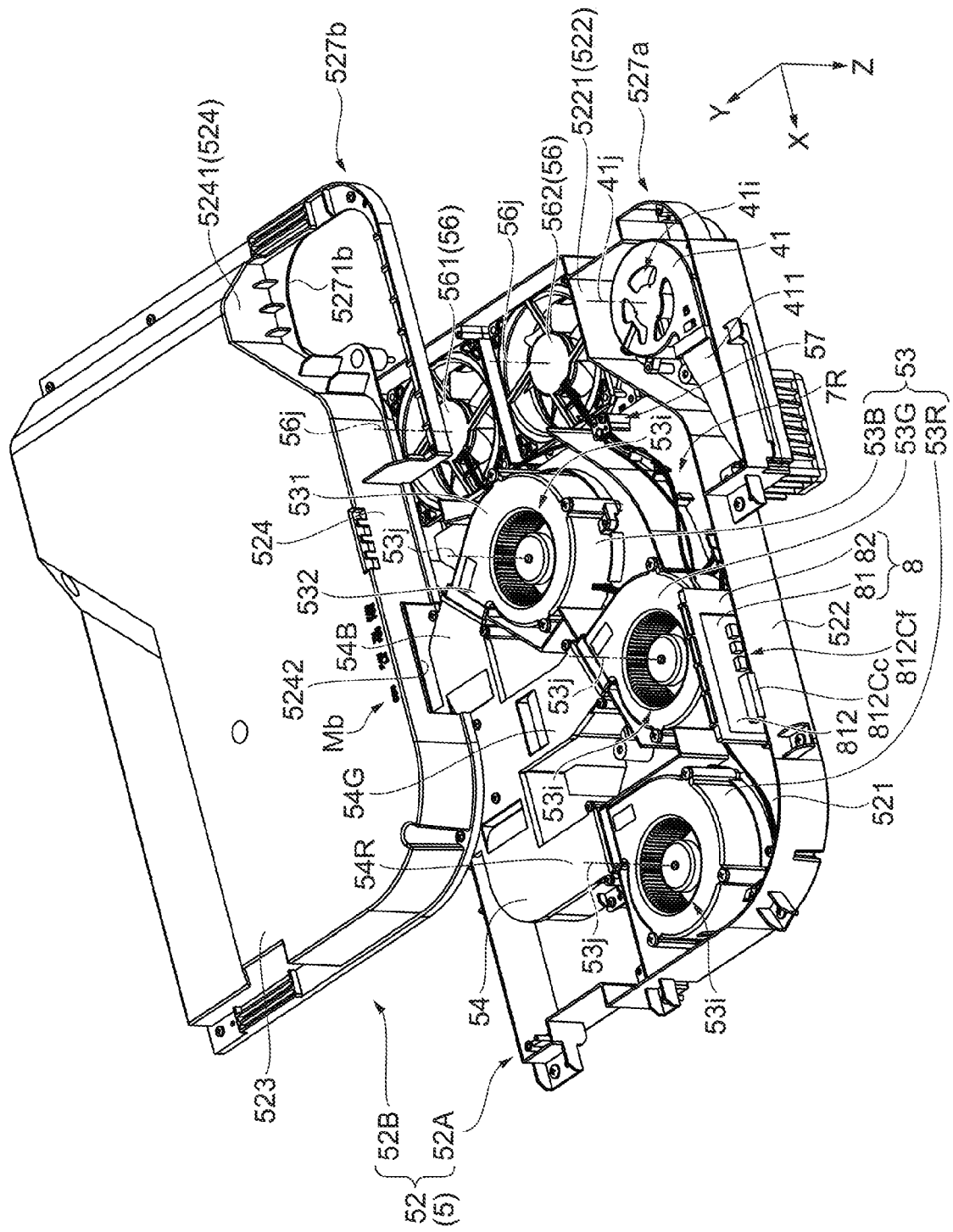
FIG. 5 is an exploded perspective view of the second accommodation section of the present embodiment viewed from obliquely below.
Figure 6:
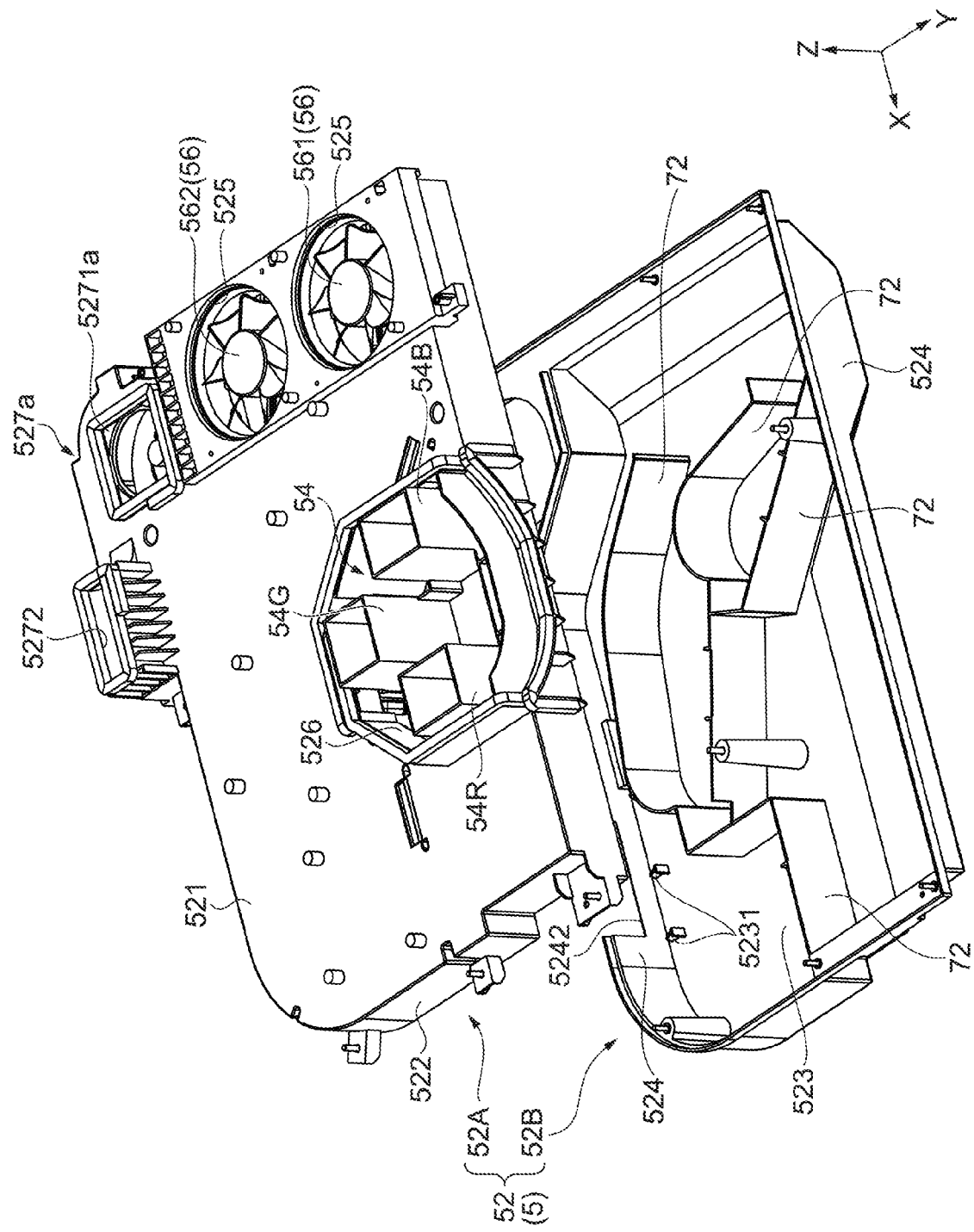
FIG. 6 is an exploded perspective view of the second accommodation section of the present embodiment viewed from obliquely above.

FIG. 4 is a perspective view of the second accommodation section 52 viewed from obliquely below. FIG. 5 is an exploded perspective view of the second accommodation section 52 viewed from obliquely below. FIG. 6 is an exploded perspective view of the second accommodation section 52 viewed from obliquely above.

The second accommodation section 52 is formed in a rectangular box-like shape in a plan view and includes an attachment-side housing 52A, to which the cooling fans 53, the circulation fans 56, the temperature detector 57, the blower fan 41, and the duct member 411 are attached, and a cover-side housing 52B, which accommodates, along with the attachment-side housing 52A, the electronic parts described above, as shown in FIGS. 4 to 6.

Specifically, the second accommodation section 52 is arranged below the optical part housing 36 (see FIG. 1), as described above, and the attachment-side housing 52A has the following surfaces roughly along an X-Y plane: an upper surface section 521 (see FIG. 6), which faces the optical part housing 36; and a side surface section 522, which protrudes from the circumferential edge of the upper surface section 521 toward the cover-side housing 52B.

The −Y-side side surface section 522 has a side surface section 5221, which is so formed that a portion of the −Y-side side surface section 522 in the vicinity of the −X-side end thereof bends in the +Y direction, and an auxiliary attachment section 527a is formed on the −Y side of the side surface section 5221. The auxiliary attachment section 527a has a portion that is an extension of the upper surface section 521 but protrudes and a raised portion that is raised from the circumferential edge of the extension portion, as shown in FIG. 5.

The cover-side housing 52B has a bottom surface section 523, which faces the upper surface section 521, and a side surface section 524, which protrudes from the circumferential edge of the bottom surface section 523 toward the attachment-side housing 52A, as shown in FIG. 5. The −Y-side side surface section 524 has a side surface section 5241, which is so formed as to follow the side surface section 5221 of the attachment-side housing 52A. On the −Y side of the side surface section 5241, a central opening 5271b is formed, and an auxiliary cover 527b, which has a shape that follows the circumferential edge of the circumferential edge of the auxiliary attachment section 527a of the attachment-side housing 52A, is formed.

The attachment-side housing 52A is fixed to the optical part housing 36 with screws, and the cover-side housing 52B is detachably attached to the attachment-side housing 52A with screws.

As described above, the second accommodation section 52 is provided with the upper surface section 521, the bottom surface section 523, and the side surface sections 522 and 524, and the area surrounded by the surface sections described above and the relay section 8 is formed as the closed space 100 in the second accommodation section 52. That is, the auxiliary attachment section 527a and the auxiliary cover section 527b are formed outside the closed space 100.

A rectangular cutout 5242 is formed in the −Y-side side surface section 524 of the cover-side housing 52B, as shown in FIG. 5, and a pair of protrusions 5231 are formed on the bottom surface section 523 and in the vicinity of the cutout 5242, as shown in FIG. 6. The cutout 5242 corresponds to an opening provided in the second accommodation section 52. The pair of protrusions 5231 are portions for supporting the relay section 8, and the shape of the protrusions 5231 will be described later in detail.

The two circulation fans 56 are arranged along the Y direction in the vicinity of the −X-side end of the attachment-side housing 52A (the two circulation fans 56 are called as follows: reference numeral 561 denotes the circulation fan 56 arranged on the +Y side; and reference numeral 562 denotes the circulation fan 56 arranged on the −Y side), as shown in FIG. 5. Each of the circulation fans 561 and 562 is so arranged that the central axis of rotation 56j of the blades extends along the Z direction.

Ventilation holes 525, through which the blades of the circulation fans 561 and 562 are exposed, are formed in the upper surface section 521 of the attachment-side housing 52A, as shown in FIG. 6, and the heat absorber (see FIG. 3) 55 is arranged in the vicinity of the ventilation holes 525. The circulation fans 561 and 562 take the cooling air in through the ventilation holes 525 circulate in the second accommodation section 52.

Further, an insertion hole 526, the circumferential edge of which protrudes and through which part of the duct member 54 is inserted, is formed in the attachment-side housing 52A, as shown in FIG. 6. The insertion hole 526 is located below the optical apparatus 34 (see FIG. 1).

Each of the cooling fans 53R, 53G, and 53B is a sirocco fan as described above and has a cylindrical section 531, which accommodates the blades and has an intake port 53i formed in the side surface on one side, and a protruding section 532, which protrudes from the cylindrical section 531 and has a discharge port (not shown), as shown in FIG. 5.

The cooling fans 53R, 53G, and 53B are arranged on the +X-direction side of the circulation fans 561 and 562 in the following order: the cooling fan 53B; the cooling fan 53G, and the cooling fan 53R in the ascending order of the distance to the circulation fans 561 and 562.

Each of the cooling fans 53R, 53G, and 53B is so arranged that the central axis of rotation 53j of the blades extends along the Z direction, the intake port 53*i* faces the cover-side housing 52B (bottom surface section 523 side), and the discharge port faces the +Y side. That is, the circulation fans 561 and 562 and the cooling fans 53R, 53G, and 53B are so arranged that the central axes of rotation 56*j* and 53*j* thereof extend in the same direction.

The blower fan 41 and the duct member 411 are attached to the auxiliary attachment section 527*a*, as shown in FIG. 5.

The blower fan 41 is a sirocco fan having intake ports 41*i* on opposite sides thereof and is so arranged that the central axis of rotation 41*j* of the blades extends along the Z direction. An opening 5271*a* (see FIG. 6), which faces the +Z-side intake port 41*i*, is formed in the auxiliary attachment section 527*a*. As for the −Z-side intake port 41*i*, air flows therein through the opening 5271*b*, which has been described above, in the auxiliary cover 527*b*.

An outlet port 5272, the circumferential edge of which protrudes in the +Z direction and through which the cooling air guided through the duct member 411 flows out, is further formed in the auxiliary attachment section 527*a*, as shown in FIG. 6. The outlet port 5272 is located below the polarization conversion element 325 (see FIG. 1).

The duct member 54 is so formed as to guide the cooling air discharged from the cooling fans 53R, 53G, and 53B to the light modulators 341R, 341G, and 341B, respectively, as described above. Specifically, the duct member 54 has a channel forming section 54R, which guides the cooling air discharged from the cooling fan 53R to the light modulator 341R, a channel forming section 54G, which guides the cooling air discharged from the cooling fan 53G to the light modulator 341G, and a channel forming section 54B, which guides the cooling air discharged from the cooling fan 53B to the light modulator 341B, as shown in FIG. 5.

The channel forming sections 54R, 54*g*, and 54B extend from the discharge ports of the respective cooling fans 53R, 53G, and 53B along the upper surface section 521, as shown in FIG. 5, then so bend as to pass through the insertion hole 526 of the attachment-side housing 52A, and so extend in the +Z direction as to be located below the light modulators 341R, 341G, and 341B, as shown in FIG. 6.

Figure 7:
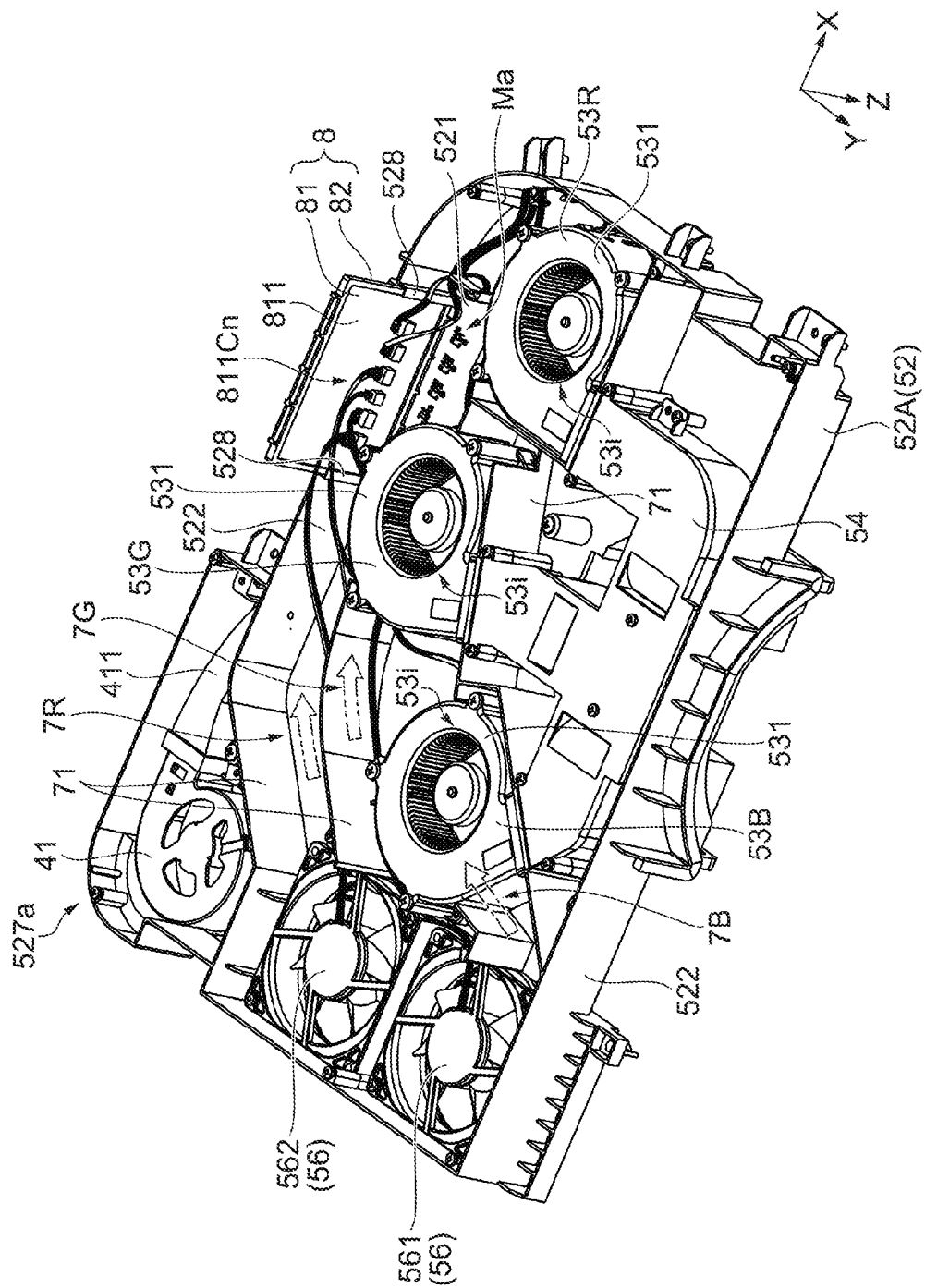
FIG. 7 is a perspective view showing the second accommodation section with a cover-side housing of the present embodiment removed and also showing members arranged in the second accommodation section.

FIG. 7 is a perspective view showing the second accommodation section 52 with the cover-side housing 52B removed and also showing members arranged in the second accommodation section 52.

In the closed space 100 in the second accommodation section 52 are provided channels 7R, 7G, and 7B, which guide the cooling air circulated by the circulation fans 56 to the cooling fans 53R, 53G, and 53B, respectively, as shown in FIG. 7.

The channels 7R, 7G, and 7B are formed by a partitioning section that is provided in the second accommodation section 52 and partitions the second accommodation section 52. The partitioning section is formed of a plurality of ribs 71 provided in the attachment-side housing 52A, a plurality of ribs 72 provided in the cover-side housing 52B (see FIG. 6), and the cylindrical sections 531 of the cooling fans 53G and 53B.

Specifically, the channel 7B is located on the +X side of the circulation fan 561, has an inlet port that is open between roughly the Y-direction center of the circulation fan 561 and the +Y-side side surface sections 522, 524 (side surface section 524 is shown FIG. 6), and is so formed as to face the intake port 53*i* of the cooling fan 53B, as shown in FIG. 7. The channel 7G is located on the −Y side of the channel 7B, has an inlet port on the +X side of the circulation fans 561 and 562, and is so formed as to face the intake port 53*i* of the cooling fan 53G. The channel 7R is located on the −Y side of the channel 7G, has an inlet port on the +X side of the circulation fan 562, and is so formed as to face the intake port 53*i* of the cooling fan 53R.

The cooling air circulated by the circulation fans 56 is guided through the channels 7R, 7G, and 7B, taken into the cooling fans 53R, 53G, and 53B, and blown through the duct member 54 to the light modulators 341R, 341G, and 341B. The heat of the air having been heated by cooling the light modulators 341R, 341G, and 341B is absorbed by the heat absorber 55 as described above, and the heat is dissipated by the heat dissipater 6.

The temperature detector 57 is formed, for example, of a thermistor and arranged in the channel 7R and in the vicinity of the circulation fan 562.

The cooling fans 53, the circulation fans 56, and the temperature detector 57 are thus accommodated in the closed space 100 in the second accommodation section 52. The blower fan 41, which is attached to the auxiliary attachment section 527*a*, and the blower fan 42, which is arranged on the +X side of the blower fan 41, form electronic parts arranged outside the closed space 100.

Figure 8B:
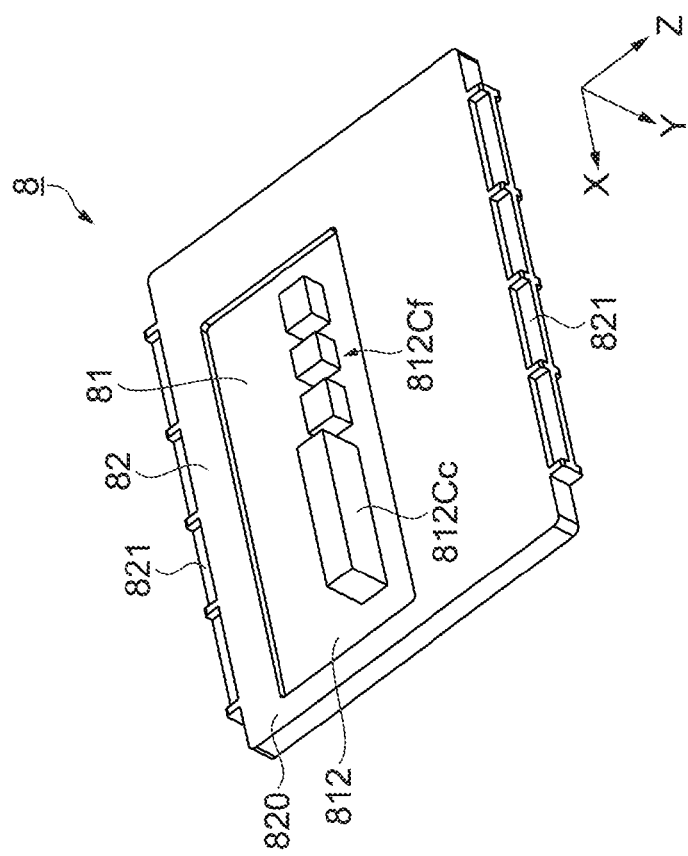
FIGS. 8A and 8B are perspective views of a relay section of the present embodiment.
Figure 8A:
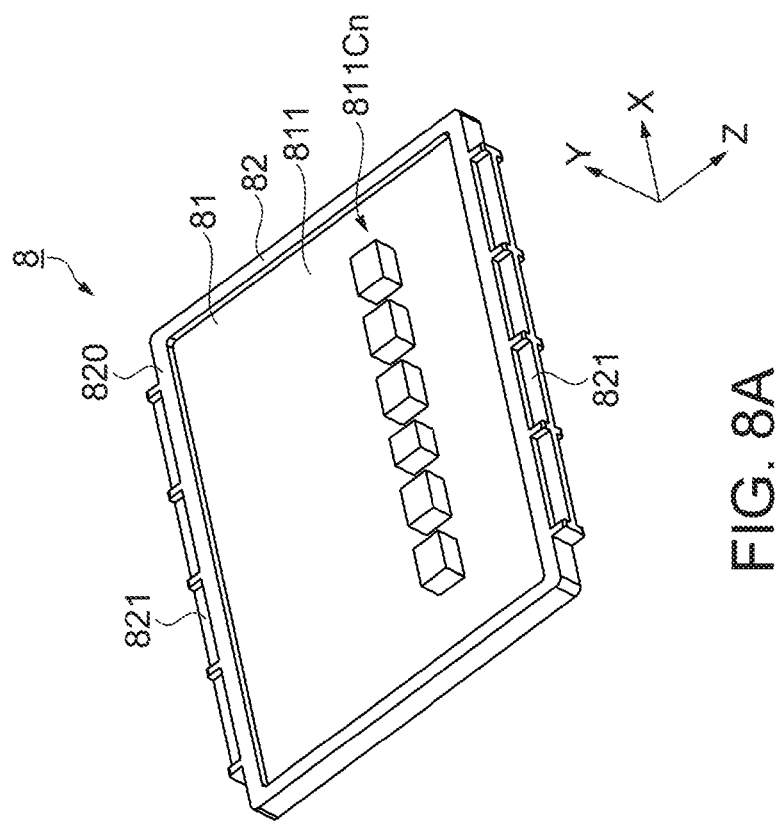

The relay section 8 will now be described in detail. FIGS. 8A and 8B are perspective views of the relay section 8. FIG. 8A shows the relay section 8 viewed from a position in the closed space 100, and FIG. 8B shows the relay section 8 viewed from a position outside the closed space 100.

The relay section 8 includes a double-sided substrate 81, which has a rectangular shape in a plan view, and an elastic member 82, which covers the end surface of the double-sided substrate 81, as shown in FIGS. 8A and 8B.

The double-sided substrate 81 is a circuit substrate having wiring patterns formed on opposite sides thereof, with a plurality of connectors 811Cn as connection members implemented on an inner surface 811 facing the closed space 100 and a connector 812Cc and a plurality of connectors 812Cf as connection members implemented on an outer surface 812 facing away from the closed space 100.

The plurality of connectors 811Cn are connectors connected to a plurality of electronic parts arranged in the closed space 100 in the second accommodation section 52 (cooling fans 53R, 53G, and 53B, circulation fans 561 and 562, and temperature detector 57), and the plurality of connectors 811Cn are fit into connectors of cables of the electronic parts. The connector 812Cc is a connector connected to the controller 10 and fit into a connector of a cable connected to the controller 10. The plurality of connectors 812Cf are connectors connected to the blower fans 41 and 42 and fit into connectors of cables of the blower fans 41 and 42.

The relay section 8 is so arranged that the double-sided substrate 81 stands with respect to the upper surface section 521 of the attachment-side housing 52A and the double-sided substrate 81 is arranged inside the −Y-side side surface sections 522 and 524 of the second accommodation section 52, as shown in FIGS. 5 and 7. The relay section 8 closes the cutout 5242 (opening), as shown in FIG. 4. Further, in the Y direction, the relay section 8 is arranged between the blower fan 41/the blower fan 42, which is arranged on the +X side of the blower fan 41, and the cooling fans 53, and the double-sided substrate 81 is so arranged as to stand also with respect to the bottom surface 2D of the exterior housing 2.

The plurality of connectors 811Cn are disposed along the X direction and so oriented that connectors of cables to be connected to the connectors 811Cn are attachable and detachable from the side facing the cover-side housing 52B (−Z side), as shown in FIG. 7.

The connector 812Cc and the plurality of connectors 812Cf are disposed along the X direction, as shown in FIG. 5, and exposed through the cutout 5242 of the cover-side housing 52B, as shown in FIG. 4. The connector 812Cc is so oriented that the connector of the cable of the controller 10 is attachable and detachable from the side facing the attachment-side housing 52A (+Z side), and the plurality of connectors 812Cf are so oriented that the connectors of the cables of the blower fans 41 and 42 are attachable and detachable from the side facing the cover-side housing 52B (−Z side). As described above, the relay section 8 also relays electrical connection between the electronic parts arranged outside the closed space 100 (blower fans 41 and 42) and controller 10.

The attachment-side housing 52A has markings Ma written on the inner surface of the upper surface section 521 and in the vicinity of the relay section 8 in correspondence with the connectors 811Cn, as shown in FIG. 7. The markings Ma are formed, for example, of characters corresponding to the electronic parts connected to the connectors 811Cn to identify the electronic parts and prevent an assembling worker from making wrong connection.

The cover-side housing 52B has markings Mb written on the outer surface of the bottom surface section 523 and in the vicinity of the cutout 5242 in correspondence with the connectors 812Cc and 812Cf, as shown in FIG. 5. The markings Mb are formed, for example, of characters corresponding to the electronic parts connected to the connectors 812Cc and 812Cf to identify the electronic parts and prevent an assembling worker from making wrong connection.

The elastic member 82 is made, for example, of elastomer and has a frame 820 and protrusions 821, as shown in FIGS. 8A and 8B.

The frame 820 has an inner-surface-side groove into which the four sides of the double-sided substrate 81 are inserted so that the circumferential edge of the double-sided substrate 81 including the end surface thereof is covered. The location where the frame 820 is formed on the outer surface 812 is not limited to the circumferential edge of the double-sided substrate 81 but is so formed over a wide area as to reach the vicinity of the connectors 812Cc and 812Cf, as shown in FIG. 8B.

The protrusions 821 are formed on and protrude from the sides of the frame 820 that face the upper surface section 521 and the bottom surface section 523 when the protrusions 821 are arranged in the second accommodation section 52. The elastic member 82 is not necessarily made of elastomer and may instead be formed of another member that has elasticity and allows the sealability of the closed space 100 to be maintained, for example, a closing member made of a combination of an organic material and an inorganic material.

A structure for fixing the relay section 8 will next be described.

Referring back to FIG. 7, the attachment-side housing 52A has a pair of support sections 528 that are formed on the −Y-side side surface section 522 and support the relay section 8. The cover-side housing 52B has the pair of protrusions 5231 (see FIG. 6) formed thereon, as described above.

Figure 9:
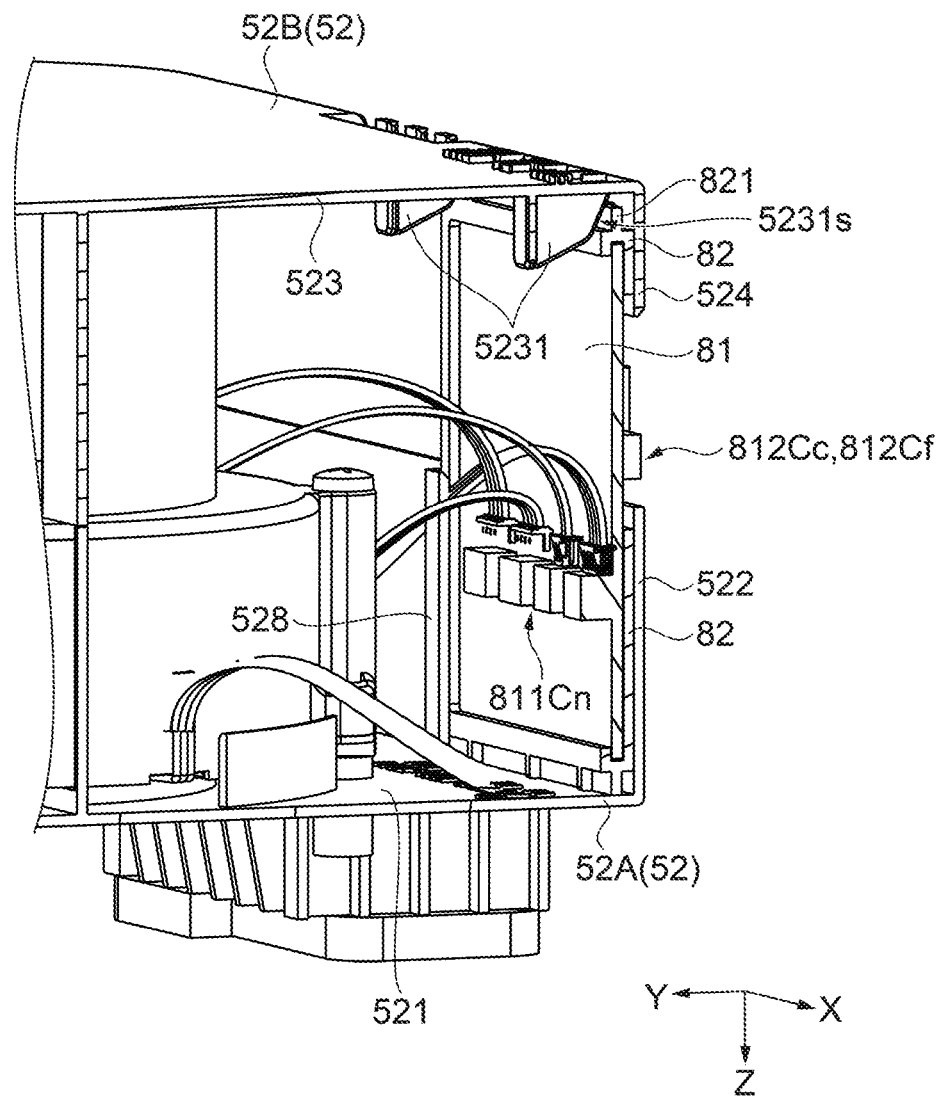
FIG. 9 is a cross-sectional view of the second accommodation section in the vicinity of the relay section of the present embodiment.

FIG. 9 is a cross-sectional view of the second accommodation section 52 in the vicinity of the relay section 8.

The relay section 8 is arranged in the second accommodation section 52 with the relay section 8 supported by the upper surface section 521 and the pair of supports sections 528 of the attachment-side housing 52A and the pair of protrusions 5231, as shown in FIGS. 7 and 9. In FIG. 9, one of the pair of the support sections 528 is omitted.

The pair of support sections 528 is provided with grooves into which X-direction opposite ends of the relay section 8 can be inserted and which restricts X-direction movement of the relay section 8. Specifically, each of the pair of support sections 528 has a plate-shaped portion separate from the side surface section 522 by a predetermined distance and a connection portion that connects the plate-shaped portion to the side surface section 522.

The pair of protrusions 5231 are so formed as to support the −Z-side of the relay section 8 arranged in the pair of support sections 528.

Specifically, each of the protrusions 5231 is so formed as to be separate from the side surface section 524 of the cover-side housing 52B by a predetermined distance and extend in a direction that intersects the side surface section 524, as shown in FIG. 9. Each of the protrusions 5231 has an end surface 5231s facing the side surface section 524, which is so inclined that the distance from the side surface section 524 increases as the distance from the bottom surface section 523 increases.

The relay section 8 is fixed in the second accommodation section 52 when one of the protrusions 821 comes into contact with the inner surface of the upper surface section 521, the X-direction opposite ends are inserted into the pair of support sections 528 and therefore placed in the attachment-side housing 52A, and the cover-side housing 52B is fixed to the attachment-side housing 52A with screws so that the other protrusion 821 and the frame 820 come into contact with the end surfaces 5231s of the pair of protrusions 5231. Since the −Z-side end of the relay section 8 comes into contact with the inclined end surfaces 5231s, not only is movement of the relay section 8 restricted in the −Z direction, but also inward inclination of the relay section 8 is not allowed, with the elastic member 82 arranged in intimate contact with the side surface sections 522 and 524.

As described above, the relay section 8 is arranged in the second accommodation section 52 with the relay section 8 sandwiched between the attachment-side housing 52A and the cover-side housing 52B with use of no screws or any other fasteners.

The projector 1 according to the present embodiment is configured to allow removal of the cover-side housing 52B of the second accommodation section 52 from the side facing the bottom surface 2D of the exterior housing 2.

Figure 10A:
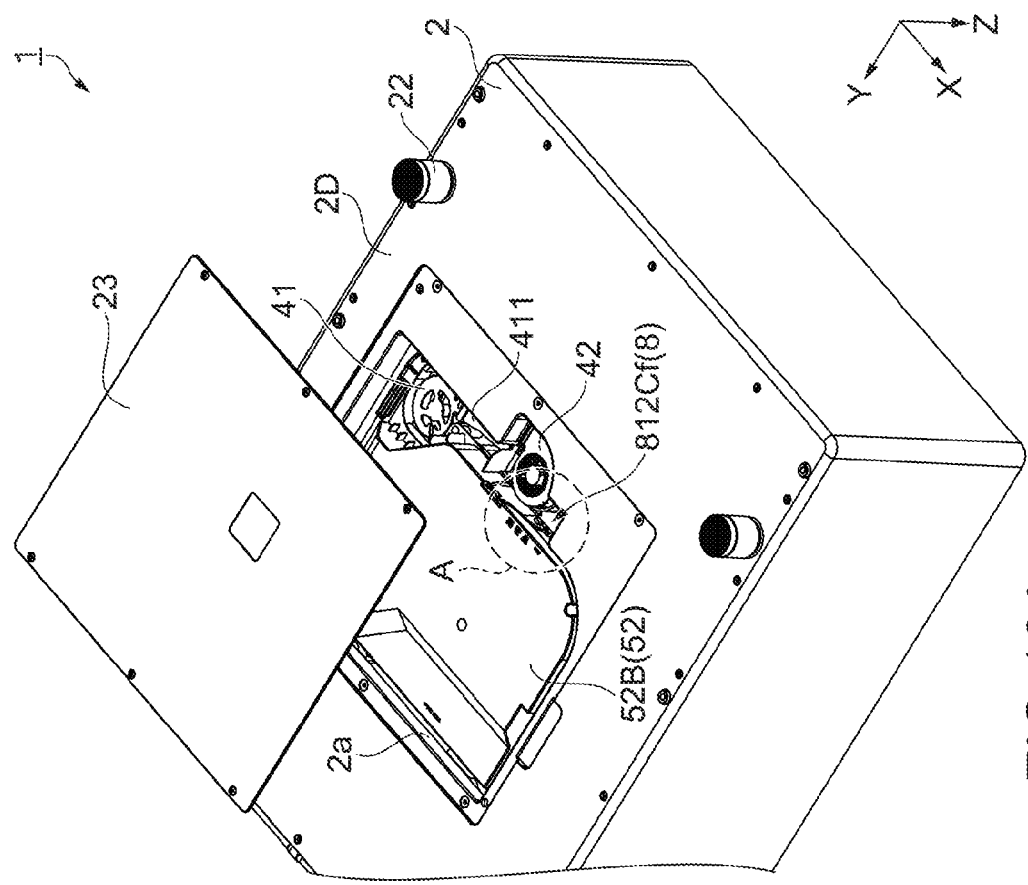
FIGS. 10A and 10B are perspective views of the projector according to the present embodiment viewed from the side facing the bottom surface of the projector with a lid member removed.
Figure 10B:
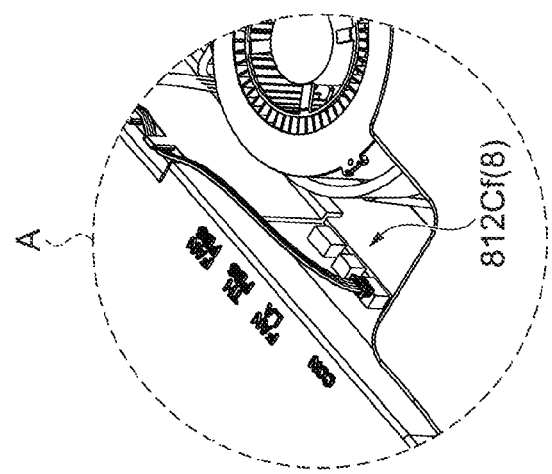

FIGS. 10A and 10B are perspective views of the projector 1 viewed from the side facing the bottom surface 2D. FIG. 10A shows a state in which the lid member 23 is removed, and FIG. 10B is an enlarged view of a portion A in FIG. 10A.

The exterior housing 2, specifically, the bottom surface 2D is provided with an exposure opening 2a, through which part of the interior of the exterior housing 2 is exposed, and the exposure opening 2a is closed with the lid member 23, as shown in FIG. 10A. The lid member 23 is fixed to a main body of the exterior housing 2 in an attachable and detachable manner.

The second accommodation section 52 is so arranged that the cover-side housing 52B is exposed through the exposure opening 2a when the lid member 23 is removed. In other words, the second accommodation section 52 is so arranged that the bottom surface section 523 of the cover-side housing 52B faces the inner surface of the lid member 23.

The exposure opening 2a is so sized as to expose the cover-side housing 52B, the blower fans 41 and 42, the duct member 411, and the connectors 812Cf, as shown in FIG. 10A.

In the state in which the lid member 523 has been removed, when the connector of the cable of the blower fan 42 is detached from the corresponding one of the connectors 812Cf, the blower fan 42 is allowed to be removed, and when the duct member 4211 is removed and the connector of the cable of the blower fan 41 is detached from the corresponding one of the connectors 812Cf, the blower fan 41 is allowed to be removed.

As described above, the projector 1 is so configured that removing the lid member 23 allows removal of the blower fans 41 and 42, which are arranged outside the closed space 100.

Figure 11A:
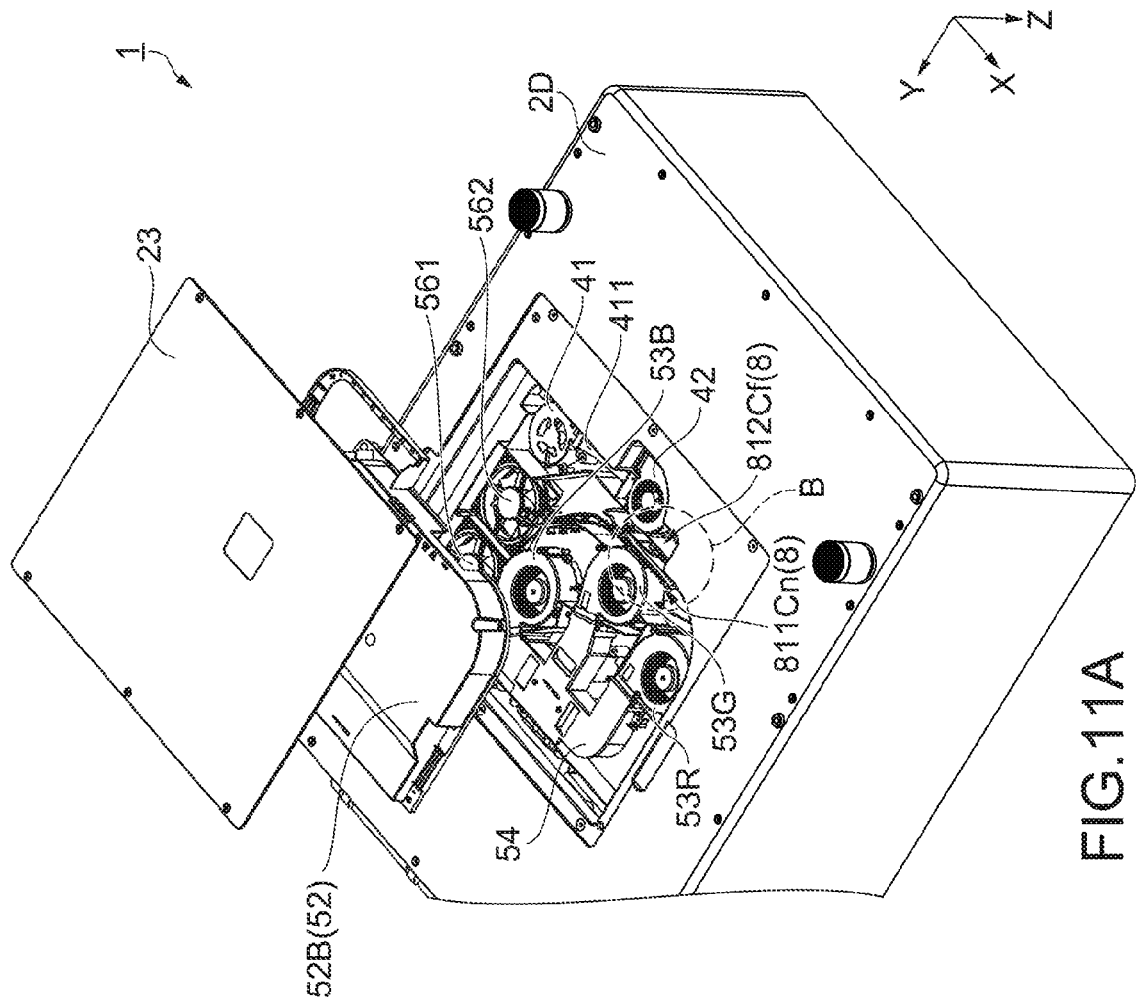
FIGS. 11A and 11B are perspective views of the projector according to the present embodiment viewed from the side facing the bottom surface of the projector with the lid member and the cover-side housing removed.
Figure 11B:
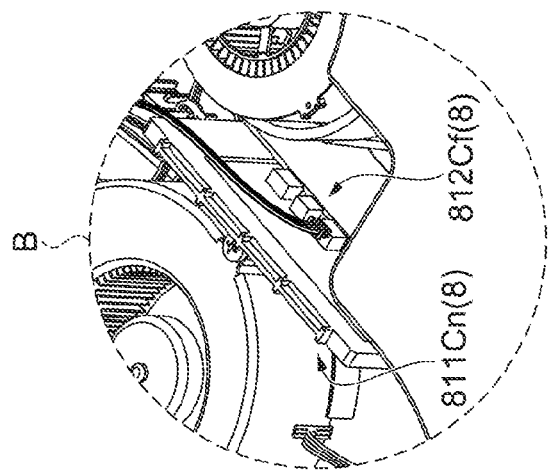

FIGS. 11A and 11B are perspective views of the projector 1 viewed from the side facing the bottom surface 2D. FIG. 11A shows a state in which the lid member 23 and the cover-side housing 52B are removed, and FIG. 11B is an enlarged view of a portion B in FIG. 11A.

In the projector 1, when the lid member 23 is removed and the cover-side housing 52B is further removed, the duct member 54 and the plurality of electronic parts arranged in the second accommodation section 52 are exposed, as shown in FIG. 11A. Although not shown in FIGS. 11A and 11B, when the cover-side housing 52B is removed, the plurality of connectors 811Cn (see FIG. 9) are also exposed, these electronic parts can be removed.

As described above, according to the present embodiment, the following advantageous effects can be provided.

(1) Since the circulation cooling device 5 has the configuration in which the relay section 8 is used to form the closed space 100, as compared with a configuration in which cables are wired from the interior to the exterior of the closed space 100, no member that fills the gap between the cables and an insertion hole through which the cables are inserted is required, and the process of wiring the cables and other processes can be simplified. The projector 1, which includes the circulation cooling device 5 that can be readily manufactured, can therefore prevent external dust from adhering to the object to be cooled in the closed space 100 but cool the object to be cooled.

Further, the relay section 8 is provided with the connectors 811Cn provided on the inner surface 811 of the double-sided substrate 81 and the connectors 812Cc and 812Cf provided on the outer surface 812 of the double-sided substrate 81, and the connectors are connected to the controller 10. As a result, the cooling fans 53, the circulation fans 56, and the temperature detector 57 arranged in the second accommodation section 52 can be readily removed by disassembling the projector 1 to a point where the connectors 811Cn on the inner surface are exposed without need to disassemble the projector 1 to a point where the controller 10 is exposed. Repair and exchange of the cooling fans 53, the circulation fans 56, and the temperature detector 57 can therefore be simplified.

(2) Since the relay section 8 includes the elastic member 82, even in a case where the double-sided substrate 81 has been so cut or otherwise processed in the manufacturing process thereof that the end surface thereof tends to produce dust, a situation in which the relay section 8 produces dust can be avoided because the elastic member 82 covers the end surface. Further, since the elastic member 82 is in intimate contact with the second accommodation section 52, the cutout 5242 (opening) of the second accommodation section 52 is reliably closed, whereby the closed space 100 can be reliably formed.

(3) Since the circulation cooling device 5 includes the circulation fans 56, the cooling air is actively supplied into the second accommodation section 52, whereby the object to be cooled can be cooled in a more efficient manner.

(4) Since the double-sided substrate 81 is used to electrically connect the blower fans 41 and 42 arranged outside the closed space 100 to the controller 10, these electronic parts can also be readily repaired and exchanged.

Further, when the lid member 23 is removed, the blower fans 41 and 42 can be removed, whereby these electronic parts can also be more readily repaired and exchanged.

(5) The closed housing is formed of the first accommodation section 51 and the second accommodation section 52. Therefore, even when the object to be cooled and the cooling fans 53 are so configured as to separate from each other, the closing housing can be readily formed with an increase in size of the closed housing suppressed. Therefore, the flexibility in the position where the cooling fans 53 are arranged can be increased, and the circulation cooling device 5 can be configured with an increase in size thereof suppressed.

(6) The relay section 8 is arranged in the second accommodation section 52 with the relay section 8 sandwiched between the attachment-side housing 52A and the cover-side housing 52B. As a result, the relay section 8 can be arranged in a predetermined position with no use of screws or other fixing members. Therefore, an increase in the number of parts can be suppressed, and the relay section 8 and the second accommodation section 52 can be reduced in size.

(7) Since the cover-side housing 52B is exposed when the lid member 23 is removed, the user can expose the electronic parts arranged in the second accommodation section 52 and the connectors 811Cn by removing the cover-side housing 52B to readily repair and exchange the electronic parts.

(8) Since the double-sided substrate 81 is so arranged as to stand with respect to the bottom surface 2D of the exteriorhousing, an increase in the size of the second accommodation section 52 in the direction along the bottom surface 2D can be suppressed, and the flexibility in the position where the relay section 8 is arranged is improved.

Variations

The embodiment described above can be changed as follows.

The relay section 8 of the embodiment described above is so arranged that the double-sided substrate 81 stands with respect to the upper surface section 521 of the attachment-side housing 52A and is sandwiched between the attachment-side housing 52A and the cover-side housing 52B, but another aspect of the relay section 8 may be employed. For example, an aspect in which the upper surface section 521 of the attachment-side housing 52A is provided with an opening and the relay section is so formed as to close the opening and fixed to the upper surface section 521 with screws may be employed.

The projector 1 according to the embodiment described above is so configured that the bottom surface 2D is provided with the exposing opening 2a, and the electronic parts in the second accommodation section 52 can be exchanged through the exposing opening 2a. The projector may instead be so configured that an exposing opening may be formed in another surface, for example, the rear surface 2B or one of the side surfaces 2R and 2L, and the electronic parts arranged in the closed space may be exchanged through the exposing opening.

The projector 1 according to the embodiment described above is so configured that the exposing opening 2a is provided in part of the bottom surface 2D, and the lid member 23 closes the exposing opening 2a. That is, the projector 1 according to the embodiment described above is so configured that the lid member 23 forms part of the bottom surface 2D, but an aspect in which the lid member 23 forms the entire bottom surface 2D may instead be employed.

The lid member 23 (see FIG. 11A) and the cover-side housing 52B (see FIG. 11A) in the embodiment described above may be integrated with each other.

Figure 12:
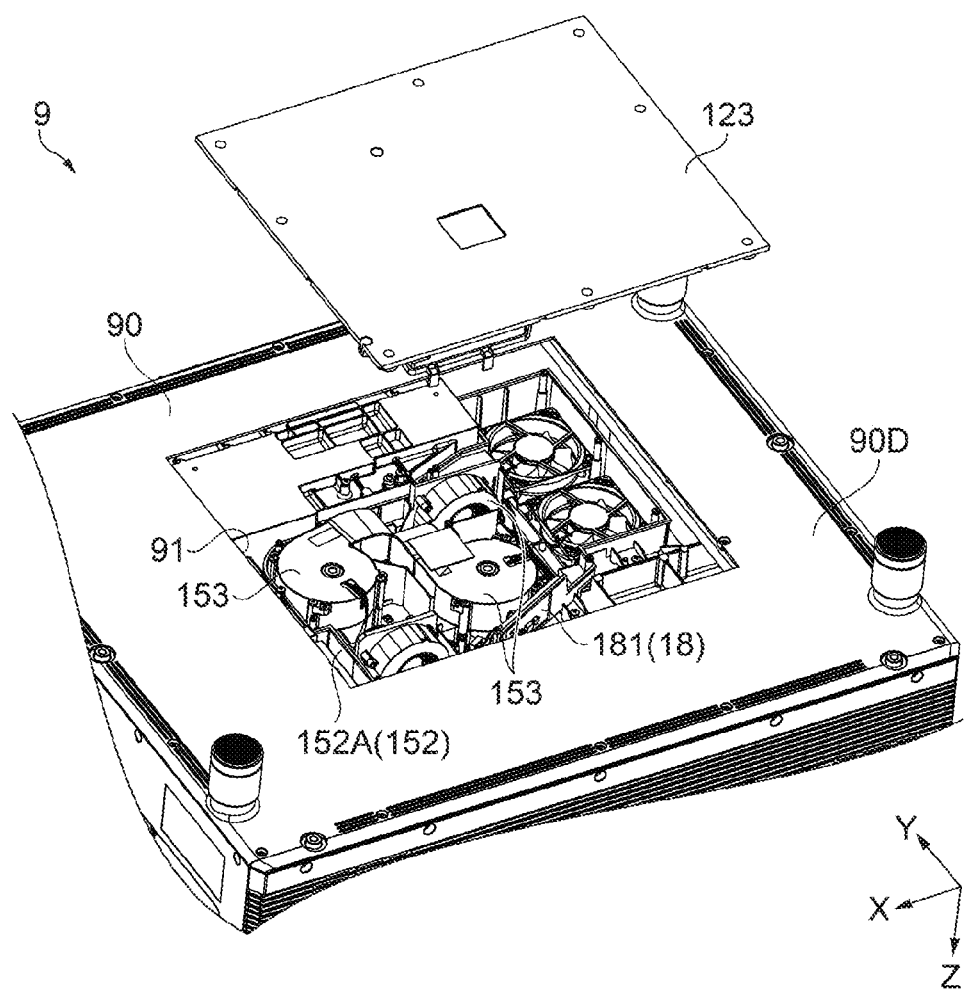
FIG. 12 describes a projector according a variation.

FIG. 12 describes a projector 9 according a variation. The projector 9 includes a plurality of cooling fans 153, a second accommodation section 152, a relay section 18, and a lid 123, as shown in FIG. 12. A bottom surface 90D of an exterior housing 90 of the projector 9 is provided with an exposing opening 91 for exposing part of the interior of the exterior housing 90. The lid 123 closes the exposing opening 91. The second accommodation section 152 has an attachment-side housing 152A and a cover-side housing 152B, and the cover-side housing 152B is integrated with the lid 123. The second accommodation section 152 is so arranged that the interior of the attachment-side housing 152A is exposed through the exposing opening 91.

Figure 13:
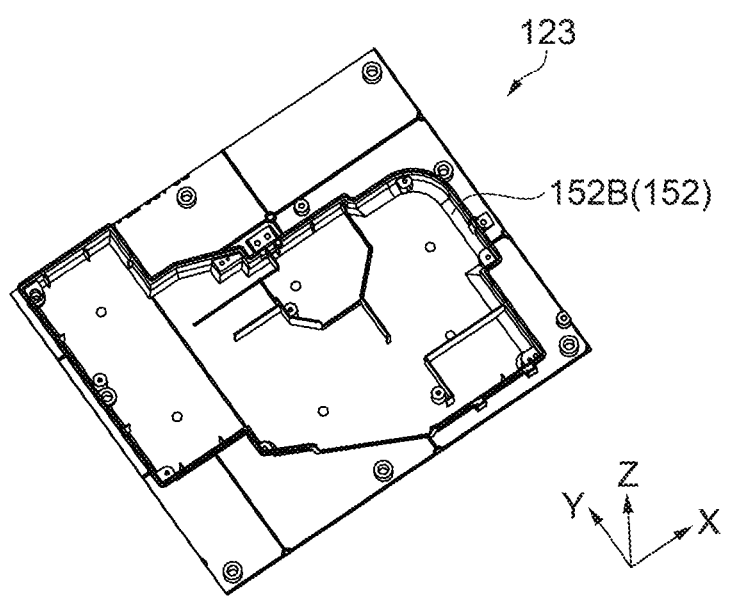
FIG. 13 is a perspective view of a lid in the projector according to the variation.

FIG. 13 is a perspective view of the lid 123 viewed from the side facing the interior of the projector 9. The lid 123 has an inner surface on which the cover-side housing 152B is provided, as shown in FIG. 13, and when the lid 123 with the cover-side housing 152B is attached to a main body of the exterior housing 90, the attachment-side housing 152A and the cover-side housing 152B fit with each other. The relay section 18 is sandwiched between the attachment-side housing 152A and the cover-side housing 152B.

The configuration of the variation allows the formation of the second accommodation section 152 and the fixation of the relay section 18 with the number of parts reduced. Further, since the user can expose the cooling fans 153 in the attachment-side housing 152A and connection members arranged on the inner surface of a double-sided substrate 181 by removing the lid 123, whereby repair and exchange of the cooling fans 153 and other components can be further simplified.

Although not shown, an aspect in which the lid 123 forms the entire bottom surface 90D of the exterior housing 90 may instead be employed.

The circulation cooling device 5 in the embodiment described above includes the three cooling fans 53R, 53G, and 53B, and a configuration in which the number of cooling fans differ from three may be employed.

Further, in the embodiment described above, the number of objects to be cooled is three (light modulators 341R, 341G, and 341B), and the same number of cooling fans 53R, 53G, and 53B are provided, but the number of objects to be cooled may differ from the number of cooling fans.

The circulation cooling device 5 in the embodiment described above includes two circulation fans 561 and 562, and a configuration in which the number of circulation fans differs from two may be employed, and even a configuration in which no circulation fan is provided may be employed.

The circulation fans 561 and 562 and the cooling fans 53R, 53G, and 53B in the embodiment described above are so arranged that the central axes of rotation 56j and 53j thereof extend in the same direction, and a form in which the central axes of rotation of the fans extend in different directions may instead be employed. For example, a configuration in which the circulation fans and the cooling fans are so arranged that the central axes of rotation of the circulation fans extend in a direction different from the direction in which the central axes of rotation of the cooling fans extend may be employed, or an aspect in which the plurality of cooling fans 153 are so arranged that the central axes of rotation thereof extend in different directions as shown in FIG. 12 may be employed.

The relay section 8 of the embodiment described above is configured to relay the electrical connection between the electronic parts, such as the cooling fans 53, and the controller 10, and the relay section 8 may also relay the electrical connection between the light modulators 341 and the controller 10. That is, a relay section including a relay substrate that electrically connects the flexible circuit substrate of the light modulators 341 to the controller 10 and an elastic member may be provided, and the relay section may form part of the closed structure.

In the embodiment described above, one surface of the double-sided substrate 81 (inner surface 811) faces the closed space 100, and the other surface of the double-sided substrate 81 (outer surface 812) forms the outer side of the closed space 100. Instead, the double-sided substrate (relay substrate) may be inserted through the closed housing, and part of the relay substrate including opposite surfaces thereof may be arranged outside the closed space 100. That is, an elastic member may be arranged between the relay substrate and a hole which is formed in the closed housing and through which the relay substrate is inserted to form the closed space 100. In this configuration, the cooling fans 53 and other components in the closed space 100 are connected to the relay substrate inside the closed space 100, and the controller 10 is connected to the relay substrate outside the closed space 100. This configuration is also applicable to the configuration using the relay substrate that electrically connects the flexible circuit substrate of the light modulators 341 to the controller 10.

In the embodiment described above, the light modulators 341 are the object to be cooled, but the object to be cooled are not limited to the light modulators 341 and may, for example, be another member, for example, the polarization conversion element 325. Further, a configuration in which the optical unit 3 includes a wave plate, a compensation element that compensates a shift of the phase of light, or any other optical element may be employed, and the wave plate, the compensation element, or any other optical element may be the object to be cooled.

In the second accommodation section 52 of the embodiment described above, a cushioning material may be interposed between the attachment-side housing 52A and the cover-side housing 52B that engage with each other except the portion where the relay section 8 is present.

The projector 1 according to the embodiment described above uses transmissive liquid crystal panels as the light modulators and may instead use reflective liquid crystal panels.

The light modulators 341 in the embodiment described above employ what is called a three-panel method using the three light modulators 341R, 341G, and 341B corresponding to R light, G light, and B light. The light modulators are not necessarily configured this way and may employ a single-panel method. Instead, the invention is also applicable to a projector including two light modulators or four or more light modulators.

As each of the light modulators, a micromirror-type light modulator, for example, a DMD (digital micromirror device) may be used.

The projector 1 according to the embodiment described above includes the two light source apparatus 31A and 31B, but the projector 1 is not necessarily configured this way, and the projector 1 may include one light source apparatus or three or more light source apparatus. Further, each of the light source apparatus does not necessarily use the discharge-type light source 311 and may use a light source based on a different method, a light emitting diode, a laser, or any other solid-state light source.

CROSS REFERENCE TO RELATED APPLICATIONS

This application claims priority to Japanese Patent Application No. 2015-106179 filed on May 26, 2015 and No. 2016-006849 filed on Jan. 18, 2016, the entire contents of which are incorporated by reference herein.

What is claimed is:

1. A projector including a light source and a light modulator and projects an image, the projector comprising:
  a circulation cooling device that has a closed housing accommodating an object to be cooled and cools the object to be cooled by circulating a cooling gas in the closed housing;
  a controller that is arranged outside the circulation cooling device and controls the projector; and
  an exterior housing that accommodates the circulation cooling device and the controller and forms an exterior of the projector,
  wherein the circulation cooling device includes
    a cooling fan that is arranged in the closed housing and blows the cooling gas to the object to be cooled,
    a heat absorber that absorbs heat of the gas having cooled the object to be cooled, and
    a relay section that forms, along with the closed housing, a closed space and relays electrical connection between the cooling fan and the controller, and
  the relay section includes a double-sided substrate having an inner surface which faces the closed space and on which a connection member electrically connected to the cooling fan is arranged and an outer surface which faces away from the closed space and on which a connection member electrically connected to the controller is arranged.

2. The projector according to claim 1,
wherein the relay section includes an elastic member that covers an end surface of the double-sided substrate and that is so arranged as to be in intimate contact with the closed housing.

3. The projector according to claim 1,
wherein the closed housing includes a first accommodation section and a second accommodation section,
the circulation cooling device further includes a circulation fan arranged in the closed space and circulating, in the second accommodation section, the cooling gas the heat of which has been absorbed heat by the heat absorber, and
the double-sided substrate has a connection member arranged on the inner surface and electrically connected to the circulation fan and relays electrical connection between the circulation fan and the controller.

4. The projector according to claim 1, further comprising an electronic part arranged outside the closed space,
wherein the double-sided substrate has a connection member arranged on the outer surface and electrically connected to the electronic part and electrically relays the electronic part to the controller.

5. The projector according to claim 1,
wherein the closed housing is formed of a first accommodation section that accommodates the object to be cooled and a second accommodation section that accommodates the cooling fan and has an opening closed by the relay section.

6. The projector according to claim 5,
wherein the second accommodation section includes an attachment-side housing to which the cooling fan is attached and a cover-side housing that accommodates, along with the attachment-side housing, the cooling fan and is detachably attached to the attachment-side housing, and
the relay section is arranged in the second accommodation section with the relay section sandwiched between the attachment-side housing and the cover-side housing.

7. The projector according to claim 6,
wherein the exterior housing has an exposing opening through which part of interior of the exterior housing is exposed and a lid member that closes the exposing opening, and
the second accommodation section is so arranged that the cover-side housing is exposed through the exposing opening when the lid member is removed.

8. The projector according to claim 6,
wherein the exterior housing has an exposing opening through which part of interior of the exterior housing is exposed and a lid that is integrated with the cover-side housing and closes the exposing opening, and
the second accommodation section is so arranged that interior of the attachment-side housing is exposed through the exposing opening.

9. The projector according to claim 1,
wherein the exterior housing has a bottom surface facing an installation surface on which the projector is installed, and
the relay section is so arranged that the double-sided substrate stands with respect to the bottom surface.

* * * * *